UNITED STATES PATENT OFFICE 1,932,833

PROCESS OF TREATING PLANT JUICES AND EXTRACTS

John James Willaman, Philadelphia, Pa., and Zoltan Imire Kertesz, Geneva, N. Y., assignors to Rohm & Haas Company, Philadelphia, Pa.

No Drawing. Application February 27, 1931
Serial No. 518,885

10 Claims. (Cl. 99—11)

This invention relates to a process for clarifying plant juices, fruit juices and extracts by means of certain enzyme preparations.

Most plant juices and extracts before special treatment are cloudy and turbid in appearance. This cloudiness is usually due to such materials as proteins, starches, pectic substances and fine cellular debris. If the particles are of sufficient size, they can readily be removed by ordinary mechanical methods such as filtration, sedimentation or centrifuging. In this invention, however, we are concerned with particles of the size called colloidal, which are too fine to be removed by ordinary mechanical methods within a reasonable length of time, but which are coarse enough to impart a turbid appearance to the liquid containing them. The removal of such colloidal material involves special processes. There are two general methods which may be employed. One method is to convert the colloidal particles by chemical treatment into particles which are sufficiently fine to pass into true solution and hence render the liquid clear and transparent. In this process the particles are really dissolved or dispersed. The other general process is to coagulate the colloidal material by chemical or physical means into aggregates of such size that they will settle to the bottom of the containing vessel and hence can be removed from the liquid by simple means. This coagulation of colloidal material is usually accompanied by the phenomenon of occulsion, by which the coagulum mechanically entrains or enmeshes fine particles of materials other than that of which the coagulum is made and which may be in the liquid at the same time. The result is that not only the material coagulated but these other materials as well are removed from the liquid during the coagulation process. This phenomenon is pointed out here particularly because it enters into the process to be described below.

Now we have discovered that some of the commonest colloidal materials found in plant juices and extracts are those known collectively as the "pectic substances". They occur especially in the expressed juices of fruits, such as those of the grape and of the apple, altho they are to be found in some amount in practically every plant juice and extract. The pectic substances are always colloidal, and hence impart a certain turbidity to the liquids containing them. Furthermore, if the pectic substances are present in even moderate degree the liquids are rather viscous, and hence filtration is unusually difficult. We have further discovered a process, to be described, which consists in the breaking down of these pectic substances by means of enzymes partly into soluble substances and partly into an insoluble coagulum, which occludes other suspended and colloidal material, as described in general above. The resultant juices and extracts are clear and free from turbidity, and the coagulated material is easily removed by ordinary mechanical methods.

The difficulty of specifically identifying the pectic substances is well known to all biochemists. When we state here that we are dealing with the pectic substances, we are implying that we have identified our materials to the extent of the present knowledge of these substances. The lines of evidence which lead us to conclude that the substances dealt with directly in this process are pectic in their nature are as follows:

(1) The precipitate formed by the enzyme preparation used, either when the latter is acting upon a natural plant juice or extract or when acting upon a solution of known pectin, is the material known generally as "pectic acid", as evidenced by its insolubility in water acidified with hydrochloric acid, its insolubility in alcohol of at least 50% concentration, the solubility in water of its sodium or ammonium salts, the insolubility in water of its calcium or barium salts, and its gelatinous nature in any form when precipitated by alcohol or by acid.

(2) The substrate acted on by the enzyme preparation cannot be protein, since the coagulum formed when the enzyme acts on grape juice contains less than 10% of protein, indicating that the protein is adventitious.

(3) The substrate of the enzyme preparation cannot be starch. Grape juice contains no starch yet we get a typical enzyme action with this material.

(4) Chemical analysis of the juice or extract for pectin before and after the action of our enzyme preparation indicates that usually about 80% of the pectin is destroyed by the time the action is completed.

(5) The action of the enzyme preparation on a known solution of pectin parallels both quantitatively and qualitatively its action on a plant juice or extract containing pectin. If the juice or extract contains no pectin, as in the case of maple syrup, there is no coagulation by the enzyme.

A pectic enzyme preparation derived from any source is suitable for carrying out the process. Our discovery is not confined to any particular method of preparing the enzymic material. However, as a source of the enzyme we prefer the mold fungi. For example, we have prepared it from selected strains of *Penicillium glaucum, aspergillus niger*, and *aspergillus flavus*. Selected strains of the following fungi also serve as excellent sources of the enzymes:—*aspergillus oryzae, aspergillus fumigatus, aspergillus parasitians* type, *aspergillus Tamari* type, *Rhizopus tritici, Rhizopus nigricans* and *aspergillus Wentii*. Most active preparations are obtained by growing the fungi on media containing, besides the usual nutrients for molds, an amount of added pectin. Other microorganisms will do as well especially if grown on a nutrient medium containing added pectin. The medium may be either liquid or solid. If the former, the medium itself may be used as the enzyme preparation after proper growth of the mold on it has taken place, or the liquid may be concentrated or dried in any way desired. If a solid medium is used for growing the fungus, an extract of the medium is made, and this extract is then used on the juice to be clarified.

It is well known that the pectic enzymes can be obtained from other plant materials, such as the leaves of various plants, corn pollen, and barley melt. We desire to include within the scope of this patent the use of these enzymes prepared from any source. We merely prefer to prepare them from the mold fungi, as mentioned above, because of convenience and the freedom of the product from undesired flavoring and coloring materials.

As with any enzymic process, such conditions as temperature, acidity and time of action must be carefully controlled and provided, so as to get the best action from the enzymes. We have found for example that a temperature of 38° C. to 40° C. is optimum for the action of these pectic enzymes. It is understood, of course, that the preparation will act at lower temperatures but more slowly. It will also act at somewhat higher temperatures for a while, but will rather soon become inactivated. We have found that a temperature in the neighborhood of 38° C. is most practical, when both the speed of action of the enzymes and their longevity are considered. The acidity of the medium should preferably be at a pH of 3 to 3.5. Again it is understood that a greater or less acidity may be used, but that the enzymes will work best at about the acidity stated. Since this is the usual acidity of such juices as those from grape and from apples, no adjustment of the acidity is necessary in such cases. The period of time during which the enzymes must be allowed to act will naturally vary with circumstances, as is always the case with enzymic processes. The period will be the shorter, the greater the amount of enzyme preparation used, and vice versa. The period will also vary with the amount of colloidal matter in the juice, with the temperature, with the acidity, and with the specific kind of plant extract involved. For example, we have clarified samples of grape juice in periods varying from six hours to five days. Enzyme preparations of such concentration can be prepared that a period of a few hours, or even of minutes, are sufficient. The adjusting of time, temperature, acidity, amount of enzyme preparation and other factors is at the discretion of the person using the process. Variations in these factors will not invalidate this process as a whole.

Assuming that the person using the process has decided upon the particular circumstances, enumerated above, which he is to use, we describe the use of the process, using grape juice as an example. In the commercial preparation of grape juice the process is usually somewhat as follows: The grapes are removed from the stem, heated in kettles to about 130° F., the juice expressed by hydraulic pressure, heated to about 180° F., filled into carboys while hot, the carboys stoppered and then stored for a period of several weeks to several months for the crystallization of the potassium bitartrate or argola. The juice is removed from the tartrate, transferred to small bottles and pasteurized at about 170° F. It is then ready for marketing. We have found that the enzyme process can be applied at any stage of this process. Thus, after the juice has stood in the carboys until the temperature has been reduced to about 38° C., the enzyme solution can be introduced through the cork of the carboy by means of a hypodermic needle and still keep the juice uncontaminated with microorganisms. The enzymes can be allowed to act to any desired extent in the carboy. The action of the enzymes will not in any way interfere with the crystallization of the tartrate; as a matter of fact, it will hasten the crystallization, because of the well-known fact that crystallization proceeds slower in the presence of colloids and that the removal of such colloids hastens the crystallization. At any time after the completion of the enzyme action, whether it be a period of days or months, the manufacturer may remove the juice from the carboys, filter in the usual manner and bottle for the consumer. The material coagulated by the enzymes will, of course, remain on the filter along with the crystals of tartrate, but it will not jeopardize the subsequent purification of the tartrate for market.

If the manufacturer of grape juice deems it more convenient, he can apply the enzyme clarification after the period allowed for tartrate crystallization. In this case he can either add the enzyme preparation to the carboys as before, or, what will probably be found most feasible, he can transfer the juice from the carboys to suitable containers, warm it to a temperature of about 38° C., and then add the enzyme preparation. When clarification is complete, which may be in a period of a few hours, or a day or two, the juice is filtered, bottled, and pasteurized as usual.

More or less the same process can be employed in using the enzyme process on other fruit juices, such as apple cider, except that in this case no crystallization of tartrate takes place and hence this period does not have to be allowed for. With any product to be clarified, the details of the procedure will have to be decided upon by the operator, merely keeping in mind the essential requirements of the enzyme as regards temperature, acidity and time, as outlined above.

It is obvious that the process described can have a further usefulness if commercially prepared pectin, such as any of those which are on the market at the present time, is purposely added to plant juices and extracts which do not have them but in which a clarifying effect is desired. An example of this is the addition of a very small amount of pectin to maple sap or syrup, its treatment with the enzyme preparation as described above, and the subsequent removal of the resultant coagulum either by the usual skimming process applied in maple syrup manufacture, or by ordinary methods of filtration.

Other examples of the usefulness of this process which may be mentioned are the clarification of sauer kraut juice and of tomato juice for beverages, the clarification of various fruit ciders and beverages, and the clarification of fruit juices preparatory to the making of jelly.

Thus our process will apply to the precipitation of pectin from any aqueous liquid for clarification purposes, whether that liquid contains pectin naturally, or whether pectin is purposely added.

Like all enzyme processes, the one described here proceeds to a conclusion gradually. The solution in which the enzymes are acting gradualy becomes more turbid as the action is nearing completion because of the formation of larger aggregates of the colloidal material; then these aggregates begin to clump together into a definite coagulum, and soon after this happens the coagulum shows a tendency to settle downwards through the liquor. When this is noticed, the reaction can be said to be completed, although with most materials there is no harm in allowing it to proceed farther. The operator will have to learn by experience when the reaction has proceeded to the most advantageous stage for his particular purpose. The reaction is best stopped by heating the liquid to a temperature of at least 55° C. for at least 10 minutes, which treatment will completely inactivate the enzymes involved.

It is understood that we are not confining ourselves to any specific temperature, acidity, enzymic preparation or nutrient medium since anyone versed in the art can readily see that wide variations are possible without departing from the scope of our invention.

We claim:

1. The process of clarifying grape juice which comprises subjecting it at a temperature of substantially 38–40° C. and an acidity of substantially 3 to 3.5 pH to the action of pectic enzymes from a fungus of the group consisting of *aspergillus niger, aspergillus flavus, Penicillium glaucum, aspergillus oryze, aspergillus fumigatus, aspergillus parasitians* type, *aspergillus Tamari* type, *Rhizopus tritici, Rhizopus nigricans* and *aspergillus Wentii*.

2. The process of clairifying grape juice which comprises subjecting it to the action of a preparation of pectic enzymes.

3. A process of treating plant juices and extracts which comprises subjecting them at a temperature of substantially 38–40° C. and an acidity of substantially 3 to 3.5 pH to the action of pectic enzymes.

4. A process of treating plant juices and extracts which comprises subjecting them to the action of a preparation of pectic enzymes.

5. A process as described in claim 4 in which the enzymes used are obtained from a fungus of the group consisting of *aspergillus flavus, aspergillus niger, Penicillium glaucum, aspergillus oryzae, aspergillus fumigatus, aspergillus parasitians* type, *aspergillus Tamari* type, *Rhizopus tritici, Rhizopus nigricans,* and *aspergillus Wentii*.

6. The process of treating plant juices and extracts which comprises adding pectin and subjecting them to the action of pectic enzymes.

7. A process as described in claim 6 in which the enzymes used are obtained from a fungus of the group consisting of *aspergillus niger, aspergillus flavus, Penicillium glaucum, aspergillus oryzae, aspergillus fumigatus, aspergillus parasitians* type, *aspergillus Tamari* type, *Rhizopus tritici, Rhizopus nigricans,* and *aspergillus Wentii*.

8. The process of clarifying apple cider which comprises subjecting it at a temperature of substantially 38–40° C. and an acidity of substantially 3 to 3.5 pH to the action of pectic enzymes from a fungus of the group consisting of *aspergillus niger, aspergillus flavus, Penicillium glaucum, aspergillus oryzae, aspergillus fumigatus, aspergillus parasitians* type, *aspergillus Tamari* type, *Rhizopus tritici, Rhizopus nigricans* and *aspergillus Wentii*.

9. The process of clarifying apple cider which comprises subjecting it to the action of a preparation of pectic enzymes.

10. A process for treating plant juices and extracts which comprises subjecting them to the action of a pectic anzyme preparation obtained by growing fungi on nutrients containing added pectin.

JOHN J. WILLAMAN.
ZOLTAN I. KERTESZ.